US010889049B2

(12) United States Patent
Torlay et al.

(10) Patent No.: US 10,889,049 B2
(45) Date of Patent: Jan. 12, 2021

(54) THERMOFORMED PART COMPRISING A DETACHABLE PART AND A PROCESS FOR MANUFACTURING SUCH A PART

(71) Applicant: APLIX, Le Cellier (FR)

(72) Inventors: Laurent Jean Michel Torlay, Le Cellier (FR); Thierry Marche, Le Cellier (FR)

(73) Assignee: APLIX, Le Cellier (FR)

( * ) Notice: Subject to any disclaimer, the term of this patent is extended or adjusted under 35 U.S.C. 154(b) by 0 days.

(21) Appl. No.: 16/314,473

(22) PCT Filed: Jun. 26, 2017

(86) PCT No.: PCT/EP2017/065656
§ 371 (c)(1),
(2) Date: Dec. 31, 2018

(87) PCT Pub. No.: WO2018/007183
PCT Pub. Date: Jan. 11, 2018

(65) Prior Publication Data
US 2019/0152125 A1    May 23, 2019

(30) Foreign Application Priority Data

Jul. 4, 2016 (FR) ...................... 16 70364

(51) Int. Cl.
*B29C 51/10* (2006.01)
*B29C 51/12* (2006.01)
(Continued)

(52) U.S. Cl.
CPC .......... *B29C 51/12* (2013.01); *A44B 18/0061* (2013.01); *A44B 18/0076* (2013.01);
(Continued)

(58) Field of Classification Search
None
See application file for complete search history.

(56) References Cited

U.S. PATENT DOCUMENTS 3,544,416 A * 12/1970 Gebhard, Jr. ............ E04D 5/145
428/99
3,742,995 A *  7/1973 Confer ..................... B29C 49/20
220/660
(Continued)

FOREIGN PATENT DOCUMENTS

DE       1852986 U  *  6/1962  ............. B29C 49/20
DE       1246215 B  *  8/1967  ............. B29C 51/12
(Continued)

OTHER PUBLICATIONS

Machine Translation of JP-2002240056-A, Aug. 2002 (Year: 2002).*
(Continued)

*Primary Examiner* — Jeffrey A Vonch
(74) *Attorney, Agent, or Firm* — Renner Kenner Greive Bobak Taylor & Weber

(57) ABSTRACT

The invention relates to a workpiece having a shape produced by thermoforming from at least one sheet (3) of plastic material, such as polycarbonate, and at least one applied element (6, 8; 7, 9) that is applied to the at least one sheet and secured there, characterised in that the securing of the at least one applied element to the at least one sheet takes place at least partially by means of crimping.

20 Claims, 8 Drawing Sheets

(51) Int. Cl.
| | |
|---|---|
| *B29C 51/42* | (2006.01) |
| *B29C 51/46* | (2006.01) |
| *B32B 3/28* | (2006.01) |
| *B32B 3/26* | (2006.01) |
| *B32B 3/06* | (2006.01) |
| *B32B 3/08* | (2006.01) |
| *B29C 65/70* | (2006.01) |
| *B29C 65/00* | (2006.01) |
| *A44B 18/00* | (2006.01) |
| *B29K 69/00* | (2006.01) |
| *B29L 31/00* | (2006.01) |
| *B29C 51/06* | (2006.01) |
| *B29L 21/00* | (2006.01) |
| *B29C 51/08* | (2006.01) |
| *B32B 3/04* | (2006.01) |
| *B32B 27/36* | (2006.01) |
| *B32B 27/06* | (2006.01) |
| *B29C 53/02* | (2006.01) |
| *B29C 33/12* | (2006.01) |
| *B29K 101/12* | (2006.01) |
| *B29K 701/12* | (2006.01) |
| *B29K 705/00* | (2006.01) |

(52) U.S. Cl.
CPC ............ *B29C 51/10* (2013.01); *B29C 51/421* (2013.01); *B29C 51/46* (2013.01); *B29C 65/70* (2013.01); *B29C 66/43* (2013.01); *B29C 66/474* (2013.01); *B29C 66/9241* (2013.01); *B32B 3/06* (2013.01); *B32B 3/08* (2013.01); *B32B 3/26* (2013.01); *B32B 3/263* (2013.01); *B32B 3/28* (2013.01); *B29C 33/12* (2013.01); *B29C 51/06* (2013.01); *B29C 51/08* (2013.01); *B29C 53/02* (2013.01); *B29C 2791/006* (2013.01); *B29K 2069/00* (2013.01); *B29K 2101/12* (2013.01); *B29K 2701/12* (2013.01); *B29K 2705/00* (2013.01); *B29K 2995/0082* (2013.01); *B29L 2021/00* (2013.01); *B29L 2031/727* (2013.01); *B29L 2031/729* (2013.01); *B29L 2031/772* (2013.01); *B32B 3/04* (2013.01); *B32B 27/06* (2013.01); *B32B 27/365* (2013.01); *B32B 2305/34* (2013.01); *B32B 2307/546* (2013.01); *B32B 2369/00* (2013.01); *B32B 2398/20* (2013.01); *Y10T 428/24008* (2015.01); *Y10T 428/24017* (2015.01); *Y10T 428/2419* (2015.01); *Y10T 428/24182* (2015.01); *Y10T 428/24339* (2015.01); *Y10T 428/24479* (2015.01); *Y10T 428/24521* (2015.01)

(56) References Cited

U.S. PATENT DOCUMENTS

| | | | | |
|---|---|---|---|---|
| 4,012,544 A | * | 3/1977 | Richards | D03D 27/00 428/95 |
| 4,110,390 A | * | 8/1978 | Olcott | B29C 45/14811 264/139 |
| 4,323,411 A | * | 4/1982 | Uhlig | B29C 49/18 156/244.14 |
| 4,395,448 A | * | 7/1983 | Lefevre | B29C 65/56 428/99 |
| 4,842,916 A | * | 6/1989 | Ogawa | B29C 33/14 428/100 |
| 5,494,542 A | * | 2/1996 | Muller | B29C 51/16 156/212 |
| 5,839,847 A | * | 11/1998 | Patel | B29C 37/0082 403/269 |
| 2007/0194592 A1 | * | 8/2007 | Lindsay | B60R 13/083 296/97.23 |
| 2008/0092585 A1 | * | 4/2008 | Althammer | F25D 23/065 62/465 |
| 2011/0258923 A1 | * | 10/2011 | Lais | A01G 13/0243 47/32.6 |
| 2014/0353455 A1 | * | 12/2014 | Floyd | B29C 66/4722 248/467 |
| 2015/0101156 A1 | * | 4/2015 | Sachee | F16B 5/07 24/446 |

FOREIGN PATENT DOCUMENTS

| | | | | | |
|---|---|---|---|---|---|
| DE | 2825097 | A1 | * | 3/1980 | ............ B29C 49/20 |
| DE | 3827207 | A1 | * | 3/1989 | ............ B65D 1/48 |
| DE | 19820512 | A1 | * | 11/1998 | ............ F16B 5/07 |
| DE | 10135847 | A1 | * | 2/2003 | ............ B29C 70/86 |
| EP | 0465983 | A1 | * | 1/1992 | ............ F16B 21/088 |
| EP | 2990173 | A1 | * | 3/2016 | ............ B62D 29/04 |
| JP | 51030867 | A | * | 3/1976 | ............ B65D 1/48 |
| JP | 55034975 | A | * | 3/1980 | |
| JP | 55150319 | A | * | 11/1980 | |
| JP | 56150606 | A | * | 11/1981 | |
| JP | 58205705 | A | * | 11/1983 | |
| JP | 61121924 | A | * | 6/1986 | ............ F16B 21/088 |
| JP | 01241427 | A | * | 9/1989 | |
| JP | 6-190910 | A | | 7/1994 | |
| JP | 06190910 | A | * | 7/1994 | |
| JP | 08108494 | A | * | 4/1996 | |
| JP | 10318221 | A | * | 12/1998 | |
| JP | 2000027817 | A | * | 1/2000 | ............ B62D 29/04 |
| JP | 2002240056 | A | * | 8/2002 | ............ B61D 17/185 |
| JP | 2004-90465 | A | | 3/2004 | |
| JP | 2004142234 | A | * | 5/2004 | |
| JP | 2010074917 | A | * | 4/2010 | |
| JP | 2014-8732 | A | | 1/2014 | |
| JP | 2014008732 | A | * | 1/2014 | |

OTHER PUBLICATIONS

Machine Translation of JP-2014008732-A, Jan. 2014 (Year: 2014).*
Machine Translation of JP-56150606-A, Nov. 1981 (Year: 1981).*
Machine Translation of JP-08108494-A, Apr. 1996 (Year: 1996).*
Machine Translation of JP-10318221-A, Dec. 1998 (Year: 1998).*
Roehm et al., Thermoforming Acrylic Sheet, Aug. 2003 (Year: 2003).*
Productive Plastics, Plastic Materials for Heavy Gauge Thermoforming, Jul. 2014 (Year: 2014).*
Machine Translation of DE-1246215-B, Aug. 1967 (Year: 1967).*
Machine Translation of JP 55-150319 A, Nov. 1980 (Year: 1980).*
Machine Translation of DE-2825097-A1, Mar. 1980 (Year: 1980).*

* cited by examiner

THERMOFORMED PART COMPRISING A DETACHABLE PART AND A PROCESS FOR MANUFACTURING SUCH A PART

The present invention refers to a part produced by thermoforming of at least one sheet of a plastic material, in particular of high rigidity, for example polycarbonate (PC). The present invention also refers to a process for manufacturing a part of this type.

From a sheet of material, in particular thermoplastic, in particular rigid at ambient temperature or use of the part, for example in polycarbonate (PC), objects of various shapes are produced by thermoforming. It is already known from the previous article that a detachable part is fixed to the thermoformed part, in particular a self-gripping component, for example a part with hooks, comprising a base component and hooks projecting from this base component.

In the thermoformed parts of the previous article, the problem is that the detachable part, in particular the self-gripping component, which in general is of a different material than that of the thermoformed part, is difficult to fix to that part, in the case of bonding or welding, the detachable part frequently breaks away either bit by bit while the part is in use, in particular by peeling, or suddenly, in particular by tension and/or by cleavage, making the part unusable. Similarly, in the field of packaging, in which the detachable part, in particular a closing by self-gripping or zipping is fixed to the package by welding, the closure is not reliable in the long term. In addition, the process of fixing a detachable part to a thermoformed part is complex, costly and requires the use of extensive and complex methods of control to ensure good quality of the fixing.

The present invention aims to overcome the problems of the previous article by proposing a part having a shape produced by thermoforming from at least one sheet of a plastic material, for example polycarbonate, and at least one detachable part attached to the part by being rigidly connected to it, for example a self-gripping component with hooks which have a long life, and in particular whose fixing lasts for a long time without risk of breaking.

According to the invention, the part with a shape produced by thermoforming from at least one sheet of a plastic material, for example polycarbonate, and at least one detachable part, for example a self-gripping component with hooks, being rigidly connected to at least one sheet, is characterised in that the rigid connection of at least one detachable part to at least one sheet is achieved, at least in part, by crimping.

By crimping the detachable part, in particular the self-gripping component with hooks, to the external surface of the thermoformed part (more particularly in a recess formed in the thermoformed sheet), the problems associated with the difficult fixing of the detachable part are overcome, in particular due to the weak affinity that the material or materials of the sheet and the detachable part may have with each other or with respect to an adhesive or a weld, and secure fixing of the detachable part to the thermoformed sheet is obtained. In addition, fixing is achieved without having to make holes in the sheet which would reduce the rigidity of the final assembly and/or would make it fragile and/or adversely affect its sealing.

According to a beneficial method of production, the detachable part is a self-gripping component with hooks, consisting of a base and a series of hooks projecting from a lower face of the base, the crimping of the detachable part being such that the base is inserted into a recess formed by the sheet in a manner that prevents it from coming out, while hooks, in particular all the hooks, remain accessible from the outside, in particular to work together with another self-gripping component, for example with loops or hooks.

For preference, the hook or hooks remain fully accessible from the outside, without having any part, in particular their stem, in contact with the sheet.

In particular, at least one of the hooks nearest to the edge of the hook field, in particular all the hooks nearest to the edge of the hook field are spaced away from the thermoformed sheet.

According to the invention, the detachable part crimped to the thermoformed sheet may also be another system of assembly, for example mechanical such as a clip (or its counterpart), a screw, a peg (plastic or metal), a pin (threaded, tapped, etc.) a strap, or magnetic such as a magnetised component.

For preference, the detachable part forms an overhang, in particular peripheral, under which the thermoformed sheet is inserted to achieve the crimping.

According to a beneficial method of production, the thickness of the sheet in the crimping zone is less than the average thickness of the sheet outside the crimping zone.

According to a beneficial method of production, the overhang is greater than at least ⅓ of the average thickness of the sheet outside the crimping zone.

For preference, the detachable part comprises a base with at least two straight parallel opposite edges defining two parallel overhangs for the sheet, so that the detachable part is crimped to the sheet while however preserving parallel mobility to the two straight edges.

For preference, the detachable part comprises a base with a circular edge defining a circular peripheral overhang for the sheet, so that the detachable part is crimped to the sheet while however preserving mobility in rotation with respect to the centre line of the base.

According to one method of production, the shape of the said shaped part is produced by thermoforming from a sheet, the sheet having a ratio of the area over the square of the thickness ($a/t^2$) greater than 200, for preference greater than 1000.

For preference, the height available for crimping, that is the distance from the outermost point of the base to the inner face of the thermoformed sheet, is greater than or equal to the average thickness of the sheet (t) outside the crimping zone, the available height (a) is preferably greater than or equal to twice the average thickness.

The present invention also refers to a process for manufacturing a part comprising at least one sheet of plastic material, for example polycarbonate, and at least one detachable part, which consists of stages in which:

- A mould is produced with an external surface corresponding to the shape of the desired final part;
- the at least one component to be added which it is desired to connect rigidly to the final part, is positioned on the external surface of the mould, for preference on a flat part (or in a recess/cavity in the mould or on a pedestal formed in the mould so as to temporarily hold the component to be detached), this positioning being done so that at least one part of at least one component is at a distance from the external surface;
- at least one sheet of plastic material, for example polycarbonate is introduced, when heated to a temperature suitable for thermoforming;
- the external surface of the mould and the at least one heated sheet are placed in contact to give the at least one sheet its final shape, during placing in contact, inserting between firstly the at least one part of the at least one component to be added at a distance from the external surface of the mould and secondly the external surface of the mould to produce crimping of the detachable part after returning the at least one sheet to a temperature lower than the bending temperature under load of the plastic material, in particular to ambient temperature.

For preference, placing the external surface of the mould comprising one or more added components in contact with the heated sheet is done using suction to flatten the sheet against the mould by forming a pressure differential (or vacuum) between them.

For preference, placing the external surface of the mould comprising one or more added components in contact with the heated sheet is done with more force at the site of the detachable part or of each detachable part with respect to the other areas of the sheet, for example by providing stronger suction at the site of the detachable part or each detachable part.

By way of an example, we now describe a preferred method of production of the invention by referring to the drawings, in which.

Figure 5A:
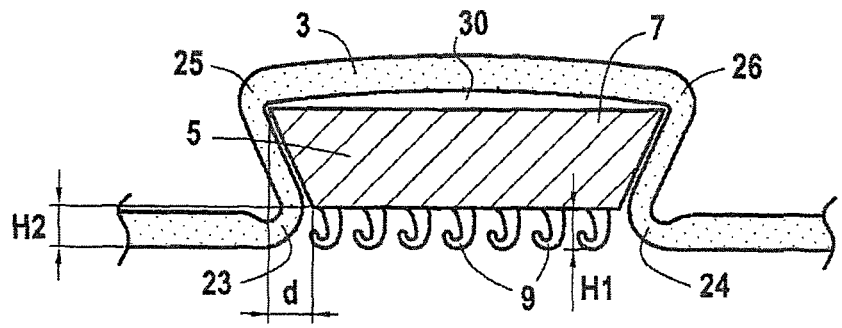
FIGS. 5A, 5B and 5C are cross-sectional views on line A-A of FIG. 4, at the site of the interface between the detachable part and the sheet of the final part, according to several scenarios, and in particular according to the prior position of the hooks with respect to the wall of the mould during application of the thermoformed sheet to the wall of the mould.
Figure 5B:
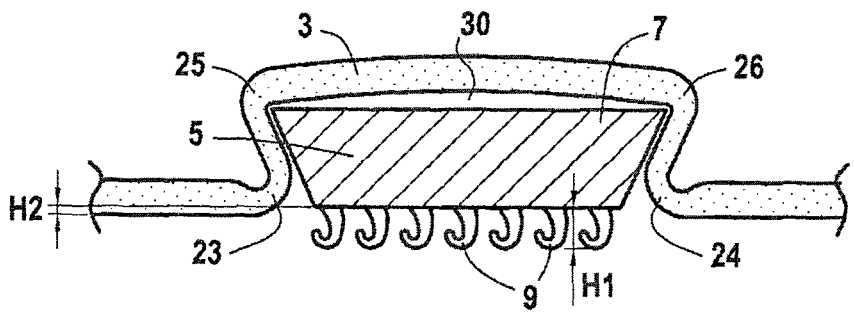
Figure 5C:
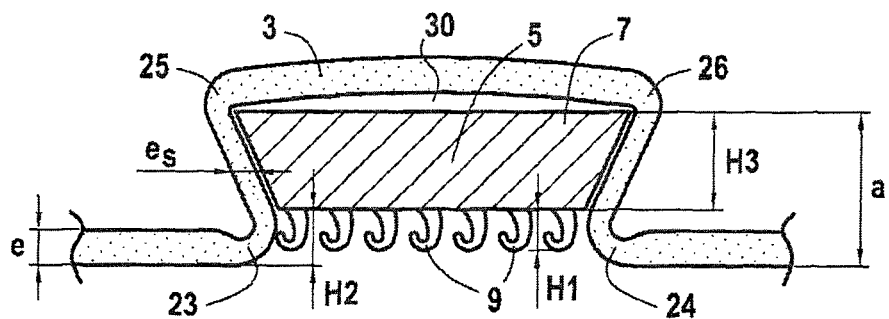
Figure 6:
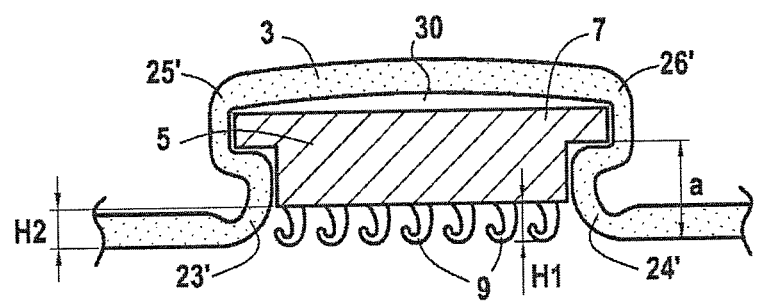
Figure 6B:
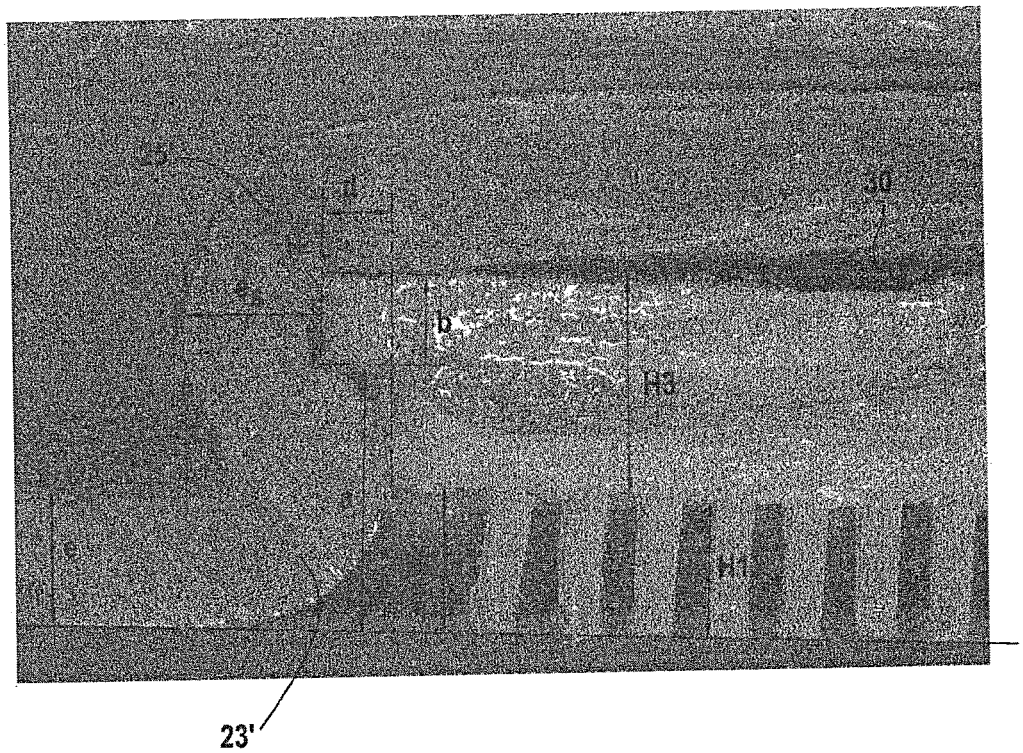
Figure 12:
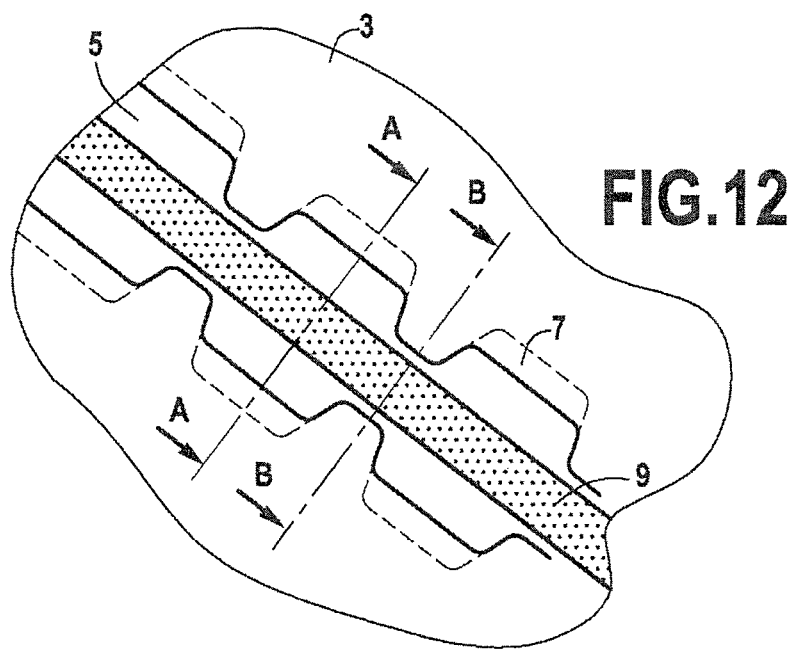
Figure 12A:
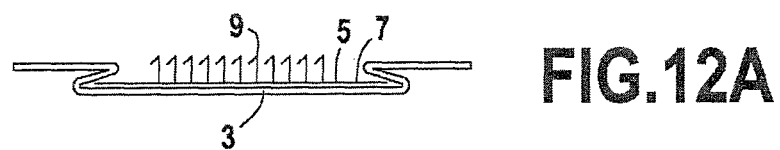
Figure 12B:
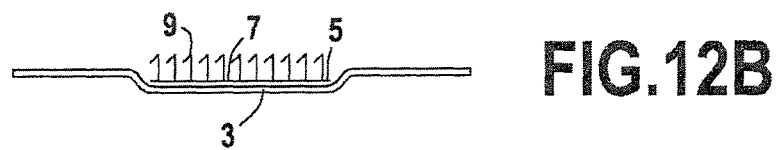
Figure 13B:
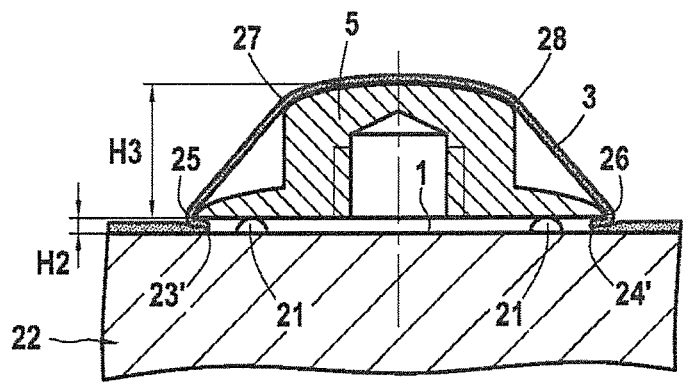
Figure 13A:
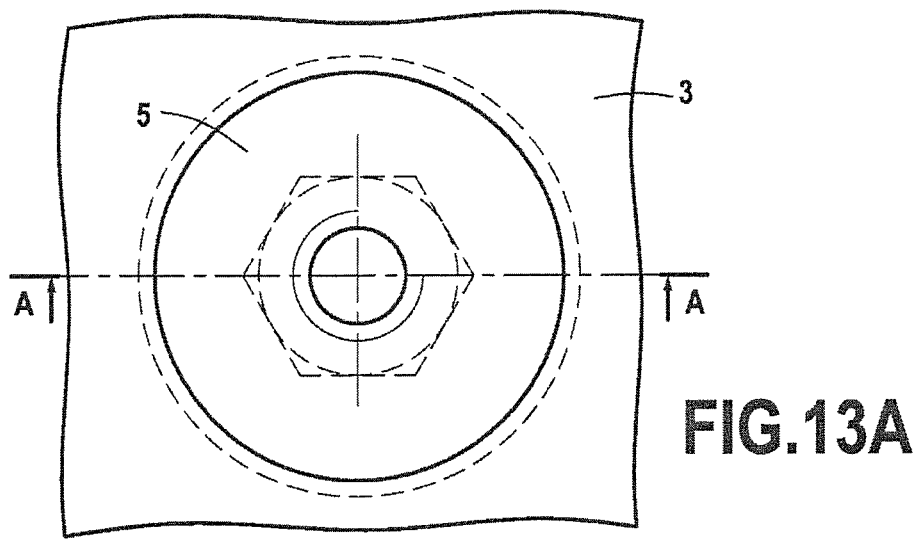
Figure 14:
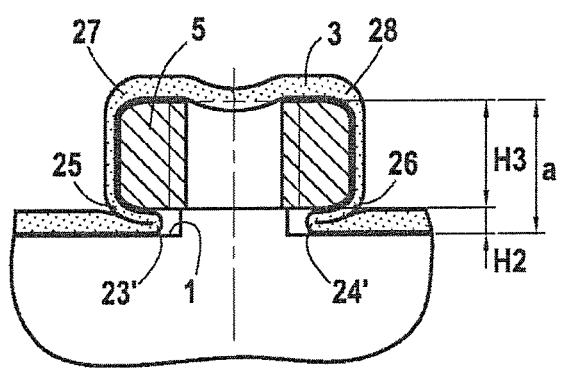

FIGS. 6, 7, 8, 9, 10, and 11 are schematic cross-sectional views similar to those of FIGS. 5A to 5C, showing other methods of production of a part according to the invention;

FIG. 6 (*b*) is a photograph of part of a part according to one method of production of the invention represented diagrammatically in FIG. 6;

FIG. 12 is a diagrammatic view from above of one method of production of a part according to the invention in the field of transport, in particular for manufacturing seats;

FIG. 12A is a cross-sectional view on line AA of FIG. 12;

FIG. 12B is a cross-sectional view on line BB of FIG. 12;

FIG. 13A is a schematic view from below of one method of producing a part according to the invention;

FIG. 13B is a cross-sectional view on line AA of FIG. 13A showing part of the mould; and FIG. 14 is a schematic cross-sectional view similar to those in FIGS. 5A to 5C, showing another method of manufacturing a part according to the invention and part of a mould.

FIGS. 1A to 10 show a process of thermoforming, in which a metal mould 22 whose external surface 1 has the shape that it is desired to give the final part is positioned in a case 2 with airtight walls. A sheet 3 of plastic material, in particular rigid, in particular of polycarbonate (PC), ABS, PS, PS/PE, PEHD, PP, PETG, PMMA, PVC, ABS/PC, KYDEX, CA (cellulose tri-acetate), EC (ethyl cellulose), PA6, POM, PET, reinforced or not or a composite with glass or carbon fibres, is placed above the case and the sheet 3 is heated by radiation to soften it and permit it to be thermoformed over the mould 22. The sheet of plastic material can be produced by extrusion, injection, moulding, lamination, compaction, blow cutting, or any other classical process for manufacturing such a sheet for thermoforming. The sheet can consist of a single material, several materials or a number of films. A sheet can also mean a preform, on which a component can be attached by the process according to the invention.

Figure 1A:
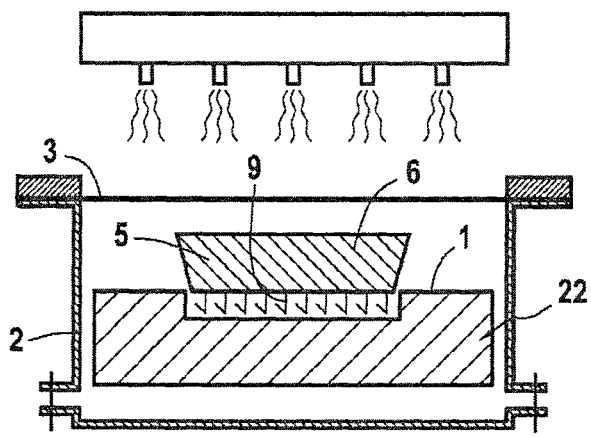
FIGS. 1A, 1B and 1C show diagrammatically the three main stages of an example of the thermoforming process of a part according to the invention.
Figure 1B:
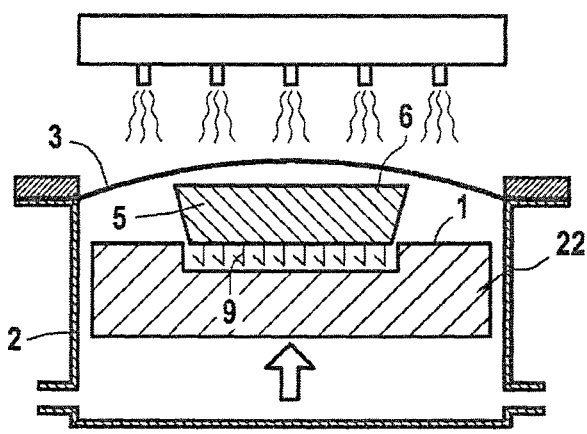
Figure 1C:
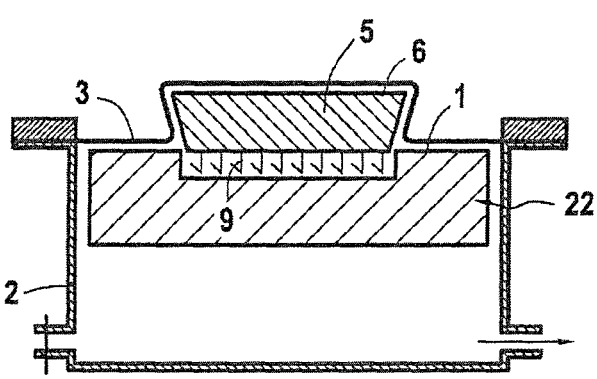
Figure 1D:
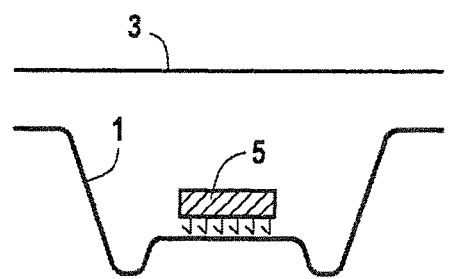
FIGS. 1D, 1E, 1F and 1G show diagrammatically the four main stages of another example of the thermoforming process of a part according to the invention.
Figure 1E:
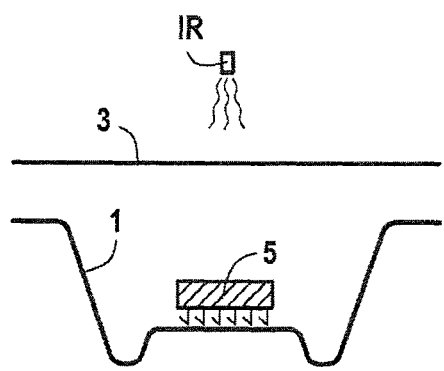
Figure 1F:
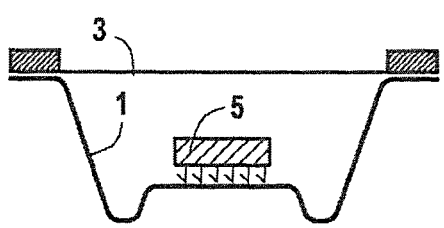
Figure 1G:
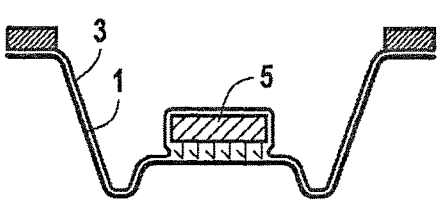
Figure 2:
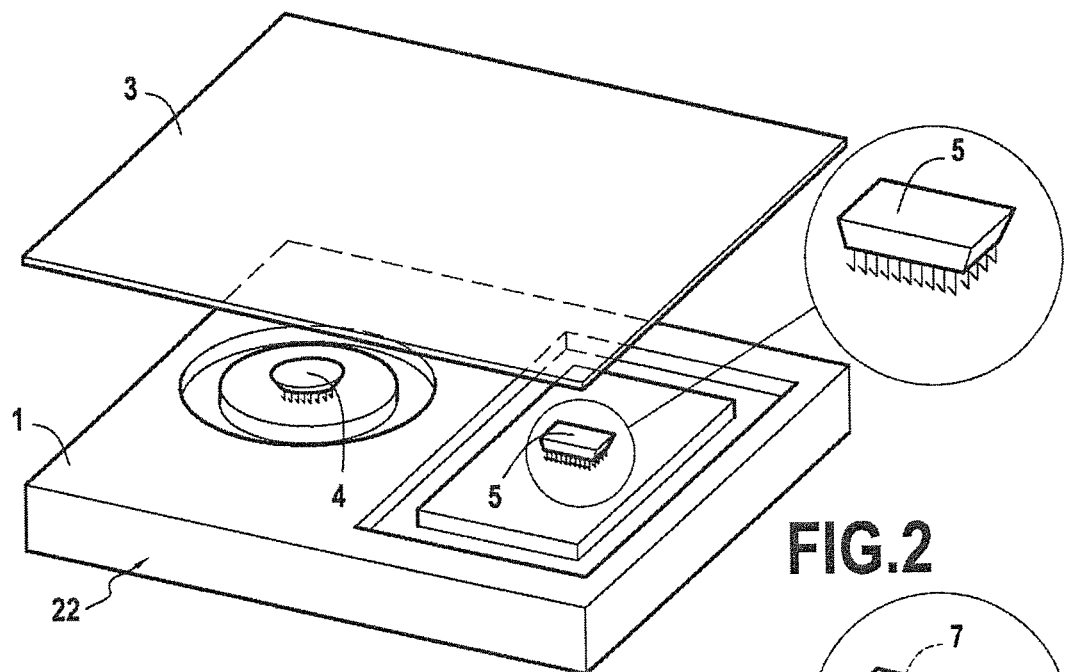
FIG. 2 shows diagrammatically the external surface of a mould before thermoforming a sheet, the detachable parts consisting of self-gripping components having previously been positioned on the external surface of the mould.
Figure 3:
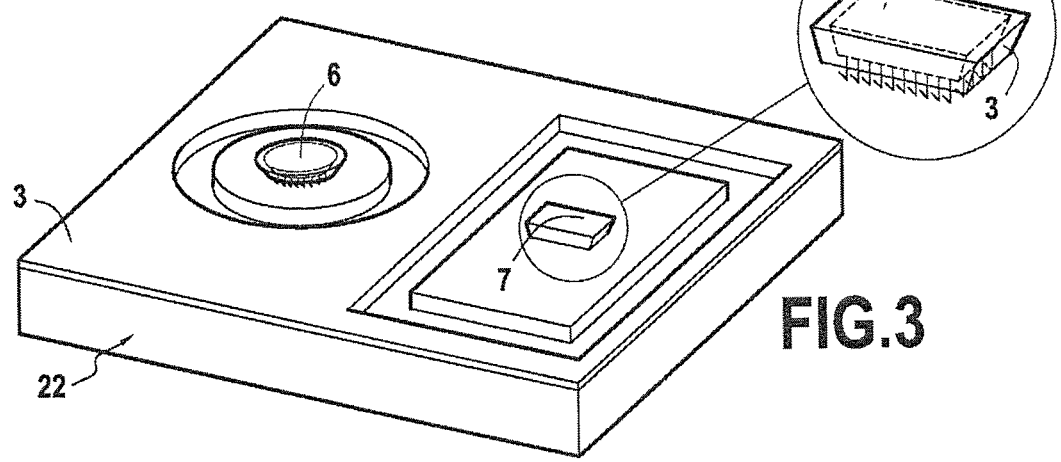
FIG. 3 is a diagrammatic view from below of the final part obtained, before its ejection from the mould.
Figure 4:
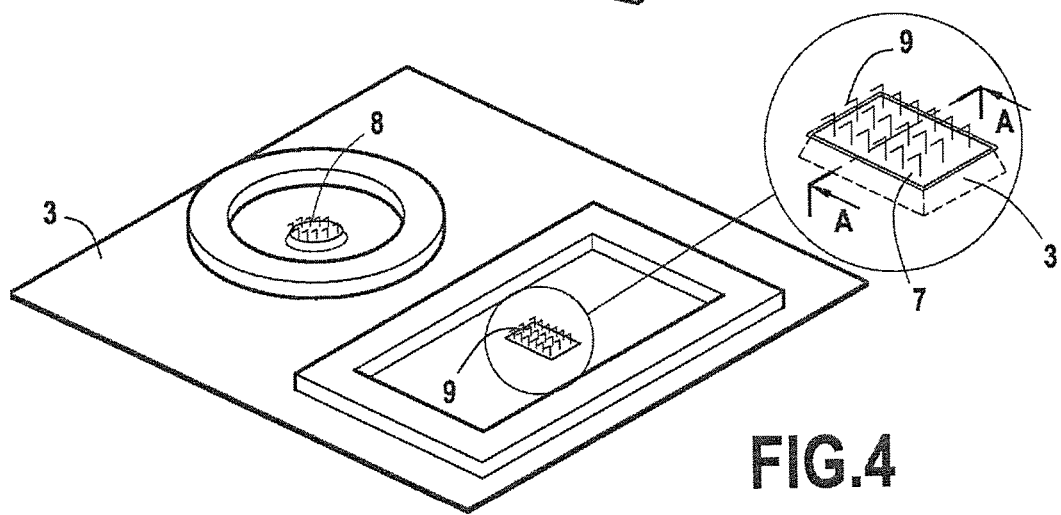
FIG. 4 is a diagrammatic view from above of the final part obtained.

As shown in FIG. 1B, the mould is then mounted with its external surface 1 opposite the softened sheet 3 and in contact with it so that, in particular by creating a vacuum in the case, the sheet 3 closely fits the shape of the external surface 1 of the mould, thereby giving the sheet 3 its final shape. The sheet can be of variable thickness. It may also be a three-dimensional preform.

Other thermoforming processes are possible according to the invention. In particular, instead of applying the mould to the sheet, the process can be reversed by applying the sheet to the mould, or the two components can be moved towards each other. The process described in FIGS. 1A to 10 is called thermoforming by inflation and suction.

Another preferred process is described in FIGS. 1D to 1G.

In the first stage (FIG. 1D), the sheet is placed above the mould and the detachable part. In the second stage (FIG. 1E) the sheet is heated, for example by infrared radiation. In the third stage (FIG. 1F), the sheet is lowered onto the mould and a seal is formed between the sheet and the mould at the edges of the sheet with a frame to form a closed, airtight cavity. In the fourth stage (FIG. 1G), the air present in the cavity is sucked out thereby creating a vacuum which deforms the sheet. The sheet then comes into contact with the mould. In the fifth stage (not shown), the mould and the sheet (the sheet and the detachable part being connected rigidly together) are separated by ejection.

Other thermoforming processes may be used, alone or in combination, including thermoforming with a punch/die, by pressure difference (vacuum and/or compressed air), rising punch, falling punch, semi-continuous thermoforming (unwinding a film, stopping, thermoforming, cutting off, repeating the cycle, and/or continuous thermoforming. Rather than unwinding a film, direct extrusion of the film may also be extended to processes that produce a preform before thermoforming by vacuum or pressure, such as blowing injection and blowing extrusion.

According to the invention, before bringing the mould and the heated extruded sheet into contact, the component(s) to be attached that is/are desired to be rigidly connected to it are positioned on the external surface of the mould, on the side opposite to the heated sheet, in particular one or more of the components 4, 5 with hooks comprising a base 6, 7 and hooks 8, projecting from the sheet. The detachable part, in particular the component with hooks, is arranged so that a part of the detachable part, for example the base 6 or 7, remains at a distance from the mould, for example by positioning the hooks on the side of the mould, against it.

To position the component or components to be added to the mould they may simply be placed above it. The component or components to be attached may also be fitted in a recess or cavity or even on a pedestal formed in the mould. It can also be temporarily fixed with adhesive, by suction, by magnetism, by clipping in a suitable recess, by a self-gripping fixing or by any similar technique.

The detachable part may be of any material, in particular plastic, thermoplastic, thermo-hardening plastic, metal, textile material or a composite of several materials of this type. The only condition is that the rigidity of the material of the part of the detachable part to be trapped in the sheet must be greater than that of the part, when the sheet is in the softened state.

For example, for a polycarbonate sheet, the rigidity or bending measured by the "bending modulus" according to standard ASTM D790, is between 1,500 and 3,500 MPa. More generally, a sheet of rigid plastic material means a sheet with a rigidity or bending measured by the "bending modulus" according to standard ASTM D790, of between 2,000 and 4,000 MPa, in particular between 2,200 and 3,500 MPa.

For example, a plastic material with a rigidity or bending measured by the "bending modulus" according to standard ASTM D790, of between 2,000 and 37,000 MPa, in particular between 2,000 and 15,000 MPa can be used, or a plastic material with a rigidity or bending measured by the "bending modulus" according to standard ASTM D790 greater than 15,000 MPa, in particular greater than 20,000 MPa can be used, for example in the case of plastic material including glass and/or carbon fibres.

During thermoforming, sheet 3 covers the upper surface of the side without hooks, of the base and is also introduced into the part under the base essentially peripherally up to the hooks so that the component with hooks is crimped into the sheet. The part shown in FIGS. 3 to 11 is then obtained.

As seen in FIGS. 5A to 5C, the base of the component with hooks is trapped in sheet 3 due to the fact that, during thermoforming, it is inserted peripherally under the base 6 or of the detachable part, and once brought to a temperature lower than the bending temperature under load of the plastic material, for example to ambient temperature, the base and therefore the detachable part are held to the sheet by crimping.

In the case of a polycarbonate sheet, the forming temperature may be between 168° C. and 188° C., the bending temperature under load being about 140° C. (with a load of 0.45 MPa).

As seen in FIGS. 5A to 5C, in the crimping zone, in transverse cross section, the sheet has the general shape of an omega ($\Omega$). The shape produced by thermoforming is a U or a rolled over C shape under the overhang d or in the overhang zone d.

As shown in FIGS. 5A to 5C, the base of the detachable part projects furthest laterally beyond the hooks at the periphery of the field of hooks by a distance d.

The distance d (called the overhang distance or overhang) is, seen in cross section, the distance measured horizontally between the outermost edge of the face of the component with hooks in which the hooks project and the furthest outermost edge of the base of the component with hooks. That corresponds to the peripheral overhang formed in the component to permit the sheet to be inserted under the base of the component.

The height H1 of the hooks may be between 0.1 and 3 mm.

The height of the hooks enables the air to be effectively evacuated by the suction equipment and enables the sheet to be flattened most effectively to the external surface of the mould, in particular to permit the stretching and flattening of the lateral edges. In other words, the hooks are formed on the external surface of the mould to permit separation of the part of the component to be removed from the external surface of the mould, thereby permitting suction of the air during thermoforming, in particular through the hooks zone, thereby forcing deformation around the detachable component. A similar result may also be obtained using a gripping part with loops.

The height H2 (called the base position height) is the distance of the lower surface of the base from which the hooks project at the bottom of the mould, that is to say the lower surface of the sheet. The height H2 may be greater than 0 (FIG. 10 for example), lower than 0 (FIG. 5A) or equal to (near 0 in FIG. 5B). The absolute value of the height H2 should preferably be less than 5 times the average thickness of the sheet "t" and less than 10 times the height H1 of the hooks.

The height H3 (called the base height) is the thickness of the plate forming the base of the component that is detachable or to be detached. The height H3 may be between 0.5 and 30.0 mm.

In the methods of implementation shown in FIGS. 5A to 5C, the base is in the form of a basic rectangular flat plate which is bevelled at its periphery at an angle of between 10° and 60°, for example 45°.

The base (see component 4 in FIGS. 2 to 4) can be given a form that is symmetrical in rotation, so that once crimped to the thermoformed sheet, it can still rotate on itself with respect to its centre line.

As shown in FIGS. 5A to 5C, the average thickness of the sheet "t" corresponds essentially to the height H1 of the hooks, and the distance of overhang d is chosen for preference to be greater than ⅓ of the average thickness of the sheet t, for preference greater than the average thickness of the sheet t, and the distance "a", called the available crimping height is chosen to be greater than the average thickness of the sheet, in particular greater than twice the average thickness of the sheet. The distance "a", the height available for crimping, is calculated from the outermost point of the base (for the horizontal position of the point and the nearest lower surface of the mould for the vertical position, see in particular FIG. 6) to the bottom of the mould, which corresponds to the plane of the lower (essentially flat) surface of the thermoformed sheet intended to be in contact with the mould.

The thickness of the sheet "ts" in the crimping zone is less than the average thickness of the sheet outside the crimping zone "t", in particular has a value of between 30% and 90% of "t", in particular between 50% and 90% of the value of "t", more particularly it may be between 50% and 70% of the value of "t".

The average thickness of the sheet "t" is preferably between 0.5 and 20 mm, more particularly between 0.5 and 5.0 mm, even more particularly between 1 and 3 mm. The average thickness here is that close to the crimping zone and outside the crimping zone.

The spacing of the hooks may be between 10 and 750 hooks/cm$^2$, in particular between 15 and 100 hooks/cm$^2$.

As seen in the diagrams, the base 6 is fitted into a sort of recess formed by folding the sheet 3. For preference, the base is in contact at its upper surface (in particular at the edges of the periphery of the base) with the sheet 3 to reduce any play permitting the detachable part to move.

The crimped detachable part is fixed to the sheet 3 partially and/or locally by a flap in a part of the sheet to the component.

In the method of implementation shown in FIGS. 5A and 6, H2 and H1 are approximately equal.

Figure 7:
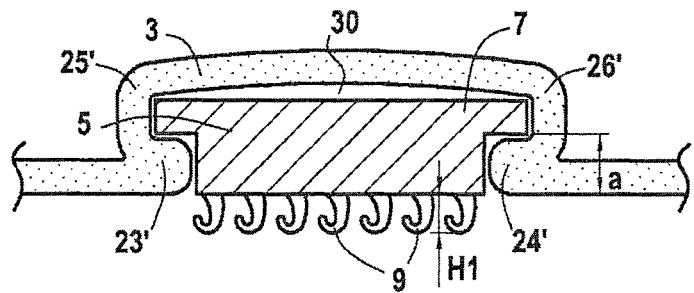
Figure 8:
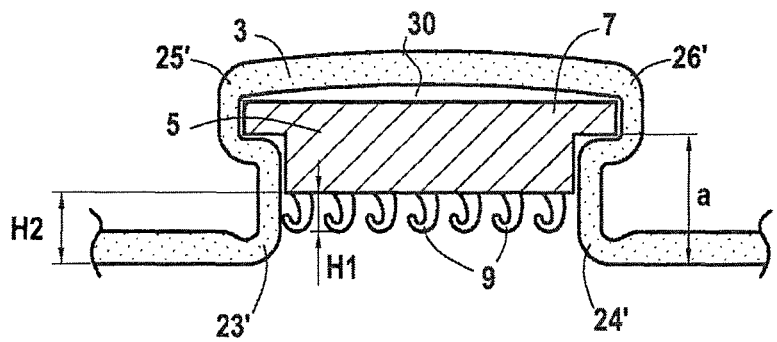

On the other hand, in the method of implementation shown in FIG. 7, H1 is greater than H2, while in the method of implementation shown in FIG. 8, the absolute value of H2 is greater than H1 (A in FIG. 8, H2 is negative).

In FIGS. 6 to 11, the various methods of implementation are shown diagrammatically at the point where the component is crimped by hooks to the thermoformed sheet.

In these FIGS. 6 to 11, the base has a stepped form, instead of having a bevelled form.

In FIGS. 5A, 5B, 5C, 6 and 6 (*b*) in particular, the part according to the invention may have a gap 30 defining a space between the base and the thermoformed sheet. This gap 30 is formed by trapping air during thermoforming. The thermoformed sheet with such a gap has a lower radius of curvature in its crimping zone than that of a thermoformed sheet without such a gap. The risk of creating a breaking point is reduced by the presence of such a gap.

Figure 9:
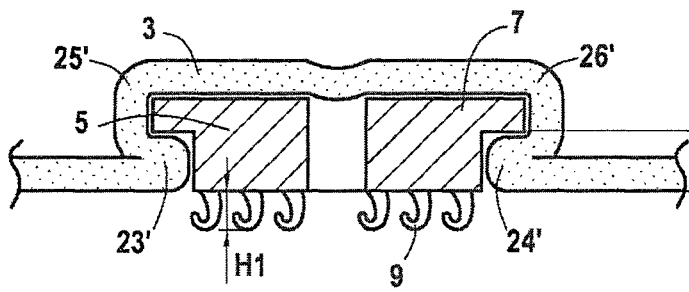
Figure 11:
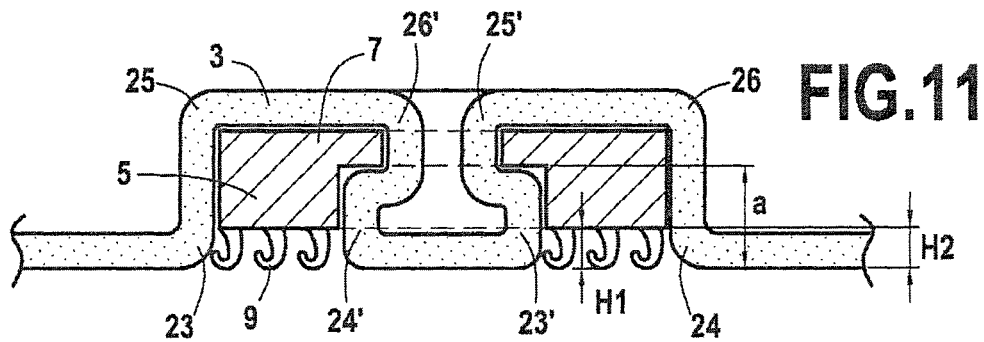

In FIGS. 9, 11 and 14 in particular, the part according to the invention may be deprived of a gap, having the benefit of reducing the total volume of the zone with the component to be attached and giving improved grip.

In FIG. 7, the hooks extend beyond the thermoformed sheet. To obtain that, the hooks were positioned in a recess at the bottom of the mould when placing the softened sheet in contact with the mould. On the other hand, in FIG. 8, the hooks were positioned on a pedestal at the bottom of the mould when placing the softened sheet in contact with the mould.

In FIG. 9, a central through hole is formed in the base. The material of the sheet has a tendency to be lightly penetrated here, which improves the fixing even more.

In FIG. 11, a through hole is also provided, but in this method of implementation, the hole passes right through the sheet, which is thus crimped round the whole periphery of the hole, at a groove in the surrounding step.

Figure 10:
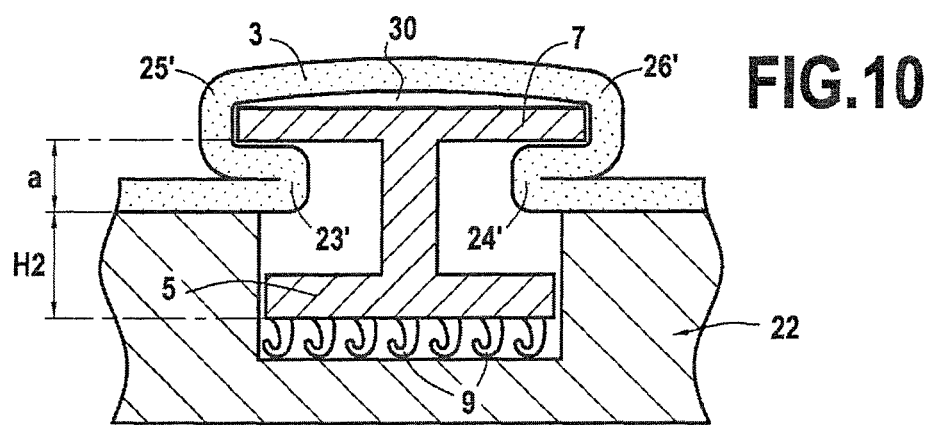

In FIG. 10, the two basic functions, that is being crimped to the sheet and carrying the hooks, are performed by two different parts of the base, that is an upper part in the form of a plate forming the crimping zone which is intended to be crimped to the thermoformed sheet, while a lower part, also in the form of a plate remains at a distance from the sheet and carries the hooks, both the lower and upper parts being connected by a part of smaller cross section, in particular in the form of a stem. In FIG. 10, a part of the mould 22 is shown to aid understanding.

A part according to the invention is shown in FIGS. 12, 12A and 12B. The detachable part is a plate made from a number of very wide first sections separated from each other by a number of narrower second sections, with hooks projecting from a zone of the upper surface of the plate which maintain a constant width. The hook zone of constant width extends over the assembly of wide and narrow plates.

FIGS. 13A, 13B and 14, show two other methods of implementation of the invention in which the detachable part is of the nut type, for example in metal or in a thermoplastic material. These parts are crimped by the presence of studs 21 formed on the external surface of the mould 22 to space the part of the detachable part away from the external surface of the mould.

Thermoforming of the part may be either partial or complete. Parts such as those described in patent applications WO2005096864, WO20130418809, US2015101156 or WO2015052349 in the name of the applicant can also be used as a detachable part.

In the methods of implementation shown in FIGS. 5A, 5B and 5C, according to the longitudinal cross section shown, two external left and right C folds 23 and 24 are formed which together define an external opening through which the attached part 5, in particular its hooks 9, is directly acces-sible from the outside. The concave side of the two C folds 23 and 24 face inward (the inside and outside are defined with respect to the sheet, the side of the sheet where part 5 is located being the outside and the other side the inside).

Two internal left and right C folds at two points 25 and 26 are formed after the external left and right C folds 23 and 24 with their concave side facing outward. The distance between the two internal C folds 25 and 26 is greater than the distance between the two external C folds 23 and 24.

In the methods of implementation shown in FIGS. 5A, 5B and 5C, the crimping zone can be defined as being the part of the sheet that extends between the external folds 23 and 24 and the internal folds 25 and 26, along the detachable part. In this crimping zone, the thickness of at least one portion of the sheet or the average thickness of the sheet is less than the thickness of the sheet in other places, in particular between folds 25 and 26 or to the left of the external left fold 23 or to the right of the external right fold 24.

In the methods of implementation shown in FIGS. 6, 6 (*b*) and 7 to 10, according to the longitudinal cross sectional view shown, two external left and right U folds 23' and 24' are formed which together define an external opening through which the detachable part 5, in particular its hooks 9, is directly accessible from the outside. The two folds 23' and 24' have their concave side facing inward (the inside and outside are defined with respect to the sheet, the side of the sheet on which part 5 is located being the outside and the other side the inside).

Two internal left and right U folds 25' and 26' are formed after the external left and right folds 23' and 24' with their concave side facing outward. The distance between the two internal folds 25' and 26' is greater than the distance between the two external folds 23' and 24'.

In the methods of implementation shown in FIGS. 6, 6(*b*) and 7 to 10, the crimping zone can be defined as being the part of the sheet that extends between the external folds 23' and 24' and the internal folds 25' and 26', along the detachable part. In this crimping zone, the thickness of at least one portion of the sheet or the average thickness of the sheet is less than the thickness of the sheet in other places, in particular between folds 25' and 26' or to the left of the external left folds 23' or to the right of the external right fold 24'.

In the method of implementation shown in FIG. 11, two detachable parts are shown, each having a left crimping zone with two right folds C 23 and 25 respectively with two folds C 24 and 26 and a right crimping zone with two U folds 24' and 26' respectively left of the two U folds 23' and 25'.

In the method of implementation shown in FIG. 11, the crimping zone may be defined as being the part of the sheet that extends between the folds external 23, 24', 23' and 24 and the internal folds 25, 26', 25' and 26 respectively which are directly adjacent to them, along the detachable part. In this crimping zone, the thickness of the sheet is less than the thickness of the sheet in other places, in particular between folds 25 and 26', between folds 25' and 26, between folds 24' and 23' or to the left of the external left fold 23 or to the right of the external right fold 24.

In the methods of implementation shown in FIGS. 13A and 13B or FIG. 14, according to the longitudinal cross sectional view shown, two external left and right U folds 23' and 24' are formed which together define an external open-ing through which the attached part 5 is directly accessible from the outside. The two U folds 23' and 24' have their concave side facing inward (the inside and outside are defined with respect to the sheet, the side of the sheet on which part 5 is located being the outside and the other side the inside).

Two internal left and right C folds 25 and 26 are formed after external left and right U folds 23' and 24' having their concave side facing outward. The distance between the two internal C folds 25 and 26 is greater than the distance between the two externals U folds 23' and 24'.

Two innermost left and right C folds 27 and 28 are formed after the internal C folds 25 and 26.

In the methods of implementation shown in FIGS. 13A and 13B or FIG. 14, the crimping zone can be defined as being the part of the sheet which extends between the external U folds 23' and 24' and the internal C folds 25 and 26 which follow them directly, along the detachable part. In this crimping zone, the thickness of the sheet is less than the thickness of the sheet in other places, in particular between the folds 25' and 26' or to the left of the external left fold 23' or to the right of the external right fold 24'. The crimping zone can also be defined as being the part of the sheet that extends between the external U folds 23' and 24' and the innermost C folds 27 and 28, along the detachable part. In this crimping zone, the thickness of the sheet is less than the thickness of the sheet in other places, in particular between the folds 25' and 26' or to the left of the external left fold 23' or to the right of the external right fold 24'.

In general, according to the invention the crimping zone can be defined as comprising at least the area of the sheet that extends, in transverse cross section, between the outermost folds having their concave side facing inward and the innermost folds directly after the outermost folds and having their concave side facing outward.

The crimping zone may also be defined as comprising at least the area of the sheet that extends, in transverse cross section, between the outermost folds with their concave side facing inward and the innermost folds having their concave side facing outward.

The fields of application of the invention are extensive, ranging from transport (automobile, aeronautical, shipping, bus, railways, etc.), in particular in the manufacture of seats, to the food industry via packing, building, energy, medical, communications, industry, and others.

The invention claimed is:

1. A shaped part comprising:
   at least one thermoformed sheet of plastic material, the thermoformed sheet comprising an upper surface and an opposing lower surface; and
   at least one detachable part, the detachable part comprising a base and a fastening component located within or on the base, the fastening component capable of being fastenable to and detachable from an other part, wherein the base comprises an outer side having an outermost point and an opposing lower side having a lowermost point, the outer side being connected to the lower side by at least one side surface, wherein the at least one side surface defines an overhang comprising a portion formed by the outer side of the base and extending a distance (d) measured from an innermost point on the side surface,
   wherein the at least one detachable part is connected to the at least one thermoformed sheet by crimping, the base being at least partially surrounded by the at least one thermoformed sheet forming a recess therein, a portion of the lower surface of the at least one thermoformed sheet covering the outer side of the base and at least a portion of the at least one side surface of the base, achieving the crimping by folding of the at least one thermoformed sheet under the overhang defining a crimping zone, wherein a thickness (ts) of the at least one thermoformed sheet in the crimping zone is less than an average thickness (t) of the least one thermoformed sheet outside the crimping zone and the distance (d) of the overhang being greater than the average thickness (t) of the at least one thermoformed sheet outside the crimping zone,
   wherein a distance (H2) measured from the lowermost point of the base to a portion of the lower surface of the at least one thermoformed sheet adjacent to the base and outside the crimping zone is greater than or equal to the average thickness of the at least one thermoformed sheet outside the crimping zone.

2. The shaped part according to claim 1, wherein the distance (H2) is less than 5 times the average thickness (t) of the at least one thermoformed sheet outside the crimping zone.

3. The shaped part according to claim 1, wherein the fastening component is a self-gripping component with hooks, consisting of a hook field located on and projecting from the lower side of the base, the hooks being accessible to work in conjunction with another self-gripping component located on the other part.

4. The shaped part according to claim 3, wherein the a areal density of the hooks is between 10 and 750 hooks/cm$^2$.

5. The shaped part according to claim 3, wherein at least one of the hooks nearest the periphery of the hook field does not contact the portion of the lower surface of the at least one thermoformed sheet forming the crimping zone.

6. The shaped part according to claim 3, wherein a height of the hooks (H1) measured from the lower side of the base is 0.1 and 3.0 mm, wherein the distance (H2) is less than 10 times the height of the hooks (H1).

7. The shaped part according to claim 1, wherein the overhang is formed as a tapered side surface, the crimping zone extending a distance (a) measured from the portion of the lower surface of the at least one thermoformed sheet adjacent to the base and outside the crimping zone to the outermost point of the base, wherein the distance (a) is greater than twice the average thickness (t) of the at least one thermoformed sheet outside the crimping zone.

8. The shaped part according to claim 1, wherein the overhang is formed as a flange, the crimping zone extending a distance (a) measured from the portion of the lower surface of the at least one thermoformed sheet adjacent to the base and outside the crimping zone to a lower surface of the flange, wherein the distance (a) is greater than twice the average thickness (t) of the at least one thermoformed sheet outside the crimping zone.

9. The shaped part according to claim 1, wherein the at least one side surface of the base comprises at least two straight parallel edges defining two parallel overhangs such that the detachable part is connected to the at least one thermoformed sheet while preserving mobility parallel to the straight edges.

10. The shaped part according to claim 1, wherein the at least one side surface of the base comprises a circular edge defining a circular peripheral overhang such that the detachable part is connected to the at least one thermoformed sheet while preserving mobility in rotation with respect to a centre line of the base.

11. The shaped part according to claim 1, wherein the base comprises a through hole, wherein the overhang is formed at an internal edge of the through hole and the at least one side surface is an internal side surface.

12. The shaped part according to claim 1, wherein the base comprises a height (H3) defined between the outer side and the inner side, wherein the height is between 0.5 and 30.0 mm.

13. The shaped part according to claim 1, wherein a gap is formed between a portion of the outer side of the base and the lower surface of the at least one thermoformed sheet covering the outer side.

14. The shaped part according to claim 1, wherein the at least one thermoformed sheet, prior to being thermoformed comprises at least one thermformable sheet having a rigidity such that its bending modulus is between 1,500 and 3,500 MPa as measured by ASTM D790.

15. The shaped part according to claim 1, wherein the plastic material is polycarbonate.

16. A manufacturing process for producing the shaped part according to claim 1 comprising at least one sheet of thermoformable plastic material and the at least one detachable part, which consists of steps comprising:
- a mould is produced having an external surface corresponding to a shape of the desired final part;
- at least one detachable part is positioned on the external surface such that at least one portion of the at least one detachable part is at a distance from the external surface of the mould;
- the at least one thermoformable sheet of plastic material is heated to a temperature enabling it to be thermoformed is placed in front of the external surface of the mould;
- the external surface of the mould and the at least one heated thermoformable sheet are bought into contact to give the sheet its final shape, the at least one thermoformable sheet being inserted between the portion of the detachable part at a distance from the external surface of the mold and the external surface of the mould to achieve the connection by crimping of the detachable part to the at least one thermoformed sheet after it has returned to a temperature lower than the thermoforming temperature of the at least one thermoformable sheet.

17. The manufacturing process according to claim 16, wherein the thermoforming temperature is at least a bending temperature of the plastic material under load and the temperature lower than the thermoforming temperature is an ambient temperature.

18. The manufacturing process according to claim 16, wherein the placing in contact of the external surface of the mould comprising the at least one detachable part with the at least one heated thermoformable sheet is done using suction to press the at least one heated thermoformable sheet against the external surface mould.

19. The manufacturing process according to claim 16, wherein the placing in contact of the external surface of the mould comprising the at least one detachable part with the at least one heated thermoformable sheet is done more forcefully at the location of the detachable part or each detachable part compared to other areas of the sheet.

20. The manufacturing process according to claim 19, wherein the placing into contact more forcefully at the location of the detachable part or each detachable part is achieved by providing stronger suction at the location of the detachable part or each detachable part.

* * * * *